United States Patent [19]

Stahlecker

[11] E Patent Number: Re. 32,670

[45] Reissued Date of Patent: May 24, 1988

[54] MOBILE CLEANING DEVICE FOR OPEN END FRICTION SPINNING MACHINES

[75] Inventor: Fritz Stahlecker, Neidhart-Strasse 18, 7347 Bad Ueberkingen, Fed. Rep. of Germany

[73] Assignees: Hans Stahlecker; Fritz Stahlecker, both of Fed. Rep. of Germany

[21] Appl. No.: 856,028

[22] Filed: Apr. 25, 1986

Related U.S. Patent Documents

Reissue of:

[64] Patent No.: 4,514,973
Issued: May 7, 1985
Appl. No.: 583,392
Filed: Feb. 24, 1984

[30] Foreign Application Priority Data

Mar. 9, 1983 [DE] Fed. Rep. of Germany ..... 3308248

[51] Int. Cl.[4] ..... D01H 7/885
[52] U.S. Cl. ..... 57/301; 57/401
[58] Field of Search ..... 57/261, 262, 263, 301, 57/302, 103–105, 400, 401

[56] References Cited

U.S. PATENT DOCUMENTS

| | | | |
|---|---|---|---|
| 3,704,579 | 12/1972 | Tooka et al. | 57/263 |
| 3,987,610 | 10/1976 | Stahlecker et al. | 57/263 |
| 4,047,371 | 9/1977 | Stahlecker | 57/301 X |
| 4,080,775 | 3/1978 | Stahlecker | 57/263 |
| 4,154,052 | 5/1979 | Alston | 57/302 |
| 4,159,620 | 7/1979 | La Flaguiere et al. | 57/263 X |
| 4,178,749 | 12/1979 | Stahlecker et al. | 57/263 |
| 4,222,222 | 9/1980 | Didek et al. | 57/401 |
| 4,339,914 | 7/1982 | Pfiefer | 57/302 |
| 4,380,892 | 4/1983 | Parker et al. | 57/263 X |
| 4,480,433 | 11/1984 | Ryer | 57/302 |

*Primary Examiner*—Donald Watkins
*Attorney, Agent, or Firm*—Barnes & Thornburg

[57] ABSTRACT

An open end friction spinning machine is disclosed which includes plurality of adjacently arranged spinning units which each have a pair of friction rollers forming a yarn twisting wedge slot. To accommodate cleaning of the friction rollers a mobile servicing cart is provided which is movable longitudinally along the machine to respective servicing positions adjacent spinning units to be cleaned. The servicing cart includes cleaning elements engageable with the rollers to clean them and air suction and blowing devices to assist in the cleaning and removal of contaminants.

53 Claims, 3 Drawing Sheets

2
34
33
B
A
30
32
31
25
26
27
28
29

2
37
46
45
47
48
42
44
43
47
48
45
46
38
38
41
39
39
D
C
40
40
13
3
25
16
35
16'
26

MOBILE CLEANING DEVICE FOR OPEN END FRICTION SPINNING MACHINES

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to an open end friction spinning machine with a plurality of adjacently arranged spinning units which respectively incude two adjacently arranged friction rollers driven in the same rotational direction and forming a wedge slot to which single fibers of opened fiber material are fed from a feeding and opening device and in which slot these fibers are twisted together to form a yarn which is drawn off by a withdrawal device.

Inside the spinning units of open end friction spinning machines, and especially in the region of the friction rollers, there can occur an accumulation of fiber fly, fiber residue, fiber dust, or other contaminants of the fiber material. These contaminants can also adhere to the outer surface of the rollers and during the course of time lead to a deterioration of the spinning results. It is therefore necessary to clean the rollers from time to time, and especially after a yarn break. In order to facilitate this cleaning, it is already known (EP-OS No. 52 412) to support the two rollers independently from one another so that they can be movable away from one another to expose the wedge slot, whereafter a manual cleaning can take place. Because the exact maintenance of the dimensons of the wedge slot is an important prerequisite for uniform spinning results, this arrangement requires a very expensive bearing construction to facilitate movement of the rollers with respect to one another. Furthermore, it is undesirable to have cleaning carried out by hand by a maintenance person because the cleaning process becomes dependent upon the care of such servicing person.

The invention is based upon the problem to design an open end friction spinning machine of the above-mentioned kind with which an automatic cleaning of the rollers can be carried out.

This problem is thereby solved in that a mobile servicing unit or cart is provided which is movable in the machine longitudinal direction and which is adjustably movable to respective spinning units to clean the friction rollers.

With the arrangement of the invention it is achieved that the cleaning of the rollers is not dependent on a servicing person and is therefore independent of the carefulness of such person in carrying out the cleaning process. It can further be provided according to preferred embodiments of the invention that the cleaning process is carried out in conjunction with operational interruptions at a spinning unit which occur in any event; for example, after a yarn break or during a yarn spool change. In certain preferred embodiments, it is provided that the servicing cart is outfitted with a detection device which detects the operational interruption and stops the cart at the affected spinning unit and carries out a roller cleaning operation. However, it is also provided in certain especially preferred embodiments that the cleaning apparatus of the servicing cart preventively clean the rollers of the individual spinning units from time to time, such as after a certain running time of the corresponding spinning unit, after a certain yarn volume, and after detection of deteriorating yarn quality by means of an auxiliary yarn quality detecting device.

According to one arrangement of the invention, each spinning unit is provided with respective cleaning elements arranged at the rollers. These cleaning elements are held in an out-of-operation position by preferably spring loaded return elements and are adjustable to an operational mode to clean the rollers by means of activating elements on the servicing cart. With this arrangement, each spinning unit is provided with its own cleaning elements so that the servicing cart itself can be very simply and economically constructed. This arrangement also exhibits the advantage that the servicing person, during a servicing operation such as start spinning, can carry out a cleaning by activating the cleaning elements of the spinning unit without waiting for the servicing cart. With these arrangements, one can advantageously arrange the cleaning elements at positions of the spinning units which are not readily accessible as long as the devices necessary for engaging with the activating elements of the servicing cart are readily accessible.

According to another arrangement of the invention, the servicing cart is provided with cleaning elements which are adjustably movable to the rollers of the respective spinning units. In this arrangement the servicing cart is then certainly in its construction somewhat more expensive than with the arrangement mentioned in the preceding paragraph. However, this arrangement avoids the necessity to have cleaning elements provided at each of the many spinning units. Furthermore, this arrangement is advantageous in that the functioning of the cleaning elements can be centrally supervised at the servicing cart so that also only a small number of cleaning elements are required that must be repaired or replaced.

In advantageous arrangements of the invention it is provided that the servicing cart includes an adjustable roller shaped cleaning brush which is movable to the yarn forming wedge slot between the two friction rollers of a spinning unit. With such a cleaning brush arrangement it is possible to carry out a very efficient cleaning with only a single brush being necessary because it can be adjustably moved into the region of the wedge slot to engage the surfaces of both friction rollers. In especially advantageous embodiments the roller shaped cleaning brush is disposed inside of a pot shaped cap or hood which engages with its rim at a housing for the rollers of the spinning unit. This hood is advantageously connected at an underpressure (vacuum pressure) source of the servicing cart. The loosened contaminants or fiber remains or the like are then immediately sucked off with the hood enclosure preventing that these contaminants travel to another position of the spinning unit or of the machine.

In further arrangements of the invention it is provided that the servicing cart is provided with at least two suction nozzles which are adjustably movable to the rollers of the respective spinning units. These suction nozzles facilitate the removal of contaminants from the regions of the rollers which are not readily accessible to a cleaning brush.

In certain advantageous preferred arrangements of the invention, the servicing cart is provided with at least two blast (pressurized air) nozzles which are adjustably movable to the rollers of a spinning unit. Especially in conjunction with the suction nozzles, these blast nozzles are advantageous because then contaminants also in the inner regions of the roller are loosened and can be removed. Because it also can occur that the contaminants are relatively fixedly adhered to the coating surface of the rollers, it is provided in further arrangements that the servicing cart is provided with at least two scratch bars or doctor blades which are adjustably movable to the rollers of a spinning unit. With these scratch bars/-doctor blades, the fixedly disposed or adhered contaminants can be loosened, separated and removed.

In advantageous arrangements of the invention, it is provided that the cleaning elements of the servicing cart are arranged at a cleaning head which is adjustably movable to respective spinning units. Such an arrangement accommodates a collection of the cleaning elements together which also facilitates their common effectiveness. Furthermore, the constructional expenditures, especially for the adjusting devices, are made smaller by providing several cleaning devices at a single cleaning head. In especially advantageous embodiments at least one guide element is provided at each spinning unit, against which guide elements the cleaning head is disposed and aligned via an abutting counter piece at the cleaning head. It is assured with this arrangement that the individual cleaning elements are exactly aligned with respect to the rollers so that they can carry out their full effectiveness. Furthermore, there are no unnecessary high tolerances required for the arrangement of the individual spinning units because the cleaning head is automatically aligned upon the adjustment against the spinning unit.

In further arrangements of the invention the servicing cart is provided with an adjustable driving device for the rollers to be cleaned at the respective spinning units. With this construction, the driving of the roller during the cleaning is facilitated with the rollers in a servicing mode disconnected from their normal operating drive. The drive via the servicing cart can then be carried out with suitable predetermined rotational speed which are optimal for cleaning, as well as with reverse rotation of the rollers to facilitate cleaning of the rollers. In situations where a cleaning process is to be carried out, without means at the spinning unit for transferring the rollers themselves to an interrupted drive maintenance position, the servicing cart is advantageously provided with a device for interrupting the drive for the rollers of a spinning aggregate or unit.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
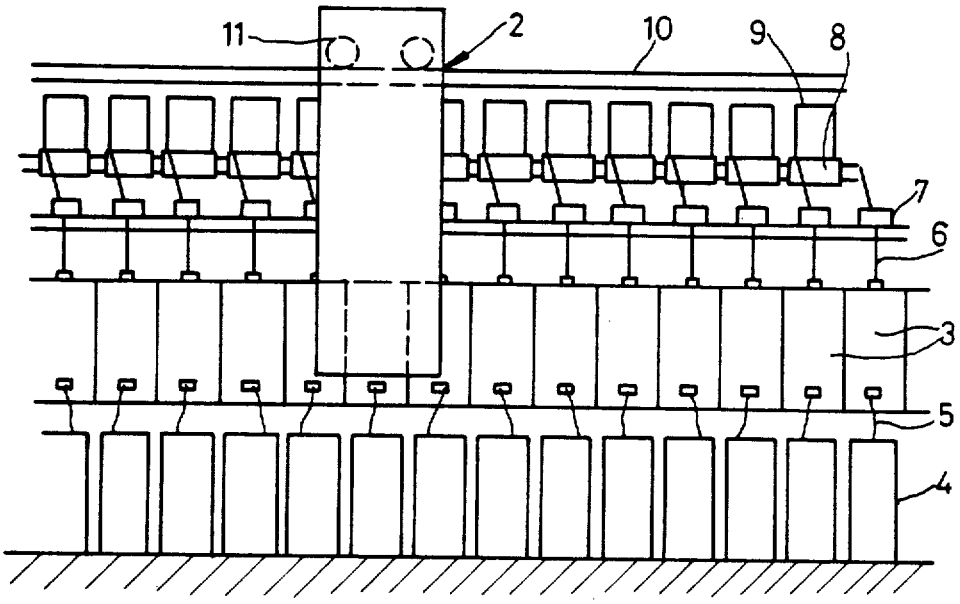
FIG. 1 is a partial schematic view of an open and friction spinning machine with a traveling servicing cart, taken from the servicing side of the machine, and showing a preferred embodiment of the invention.
Figure 2:
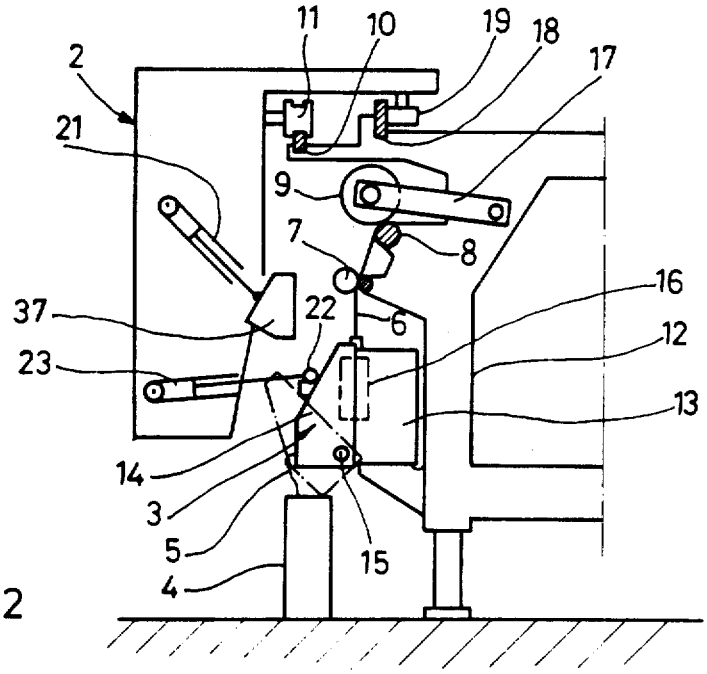
FIG. 2 is a schematic cross-sectional view of the open end friction spinning machine according to FIG. 1, taken through the servicing cart and an associated spinning unit.

The open end friction spinning machine illustrated in FIGS. 1 and 2 exhibits a plurality of similar adjacently arranged spinning units 3. Each of the respective spinning units 3 are fed with a fiberband 5 out of respective cans 4, which fiberband is spun in a spinning unit 3 to a yarn 6 which is drawn off in the vertical direction towards the top by means of a withdrawal roller pair 7. Thereafter the yarn 6 is transferred to a spooling or winding device which is disposed at each spinning unit, and includes a through extending shaft supporting grooved rollers 8, and respective spools 9 held by means of respective pivotable spool holders 17. At the machine frame 12, there are through extending rails 10 and 18 attached above the winding devices, at which rails a servicing cart 2 with traveling wheels 11 and 19 travels.

Each spinning unit 3 consists respectively of a friction unit 13 and an opener unit 14. The friction units receive the rollers 16 and 16', which in a not more closely illustrated manner are disposed vertically adjacent one another in a housing of the friction unit 13 and are driven in the same rotational direction by means of a through extending tangential belt 27 (FIG. 3) extending in the machine longitudinal direction. The rollers 16 and 16' form a wedge slot 35. Individual open fibers are separated from the fiberband 5 and fed via an opening unit 14 formed as a feeding and opening device to the wedge slot 35 where the twisting of the yarn 6 results. The opener unit 14 is pivotable about an axle 15 at the friction unit 13 so that it can be pivoted to the servicing position illustrated in FIG. 2 in dashed lines.

The servicing cart 2 possesses a schematically illustrated device for pivoting the opener unit 14 to the servicing position, which for example is formed out of a hydraulic press 23 with a ball button 22 engageable into an opening or a receptacle of the opener unit 14 arranged at the servicing cart 2. With this hydraulic press (piston cylinder unit) 23 the opener unit 14 can be pivoted to the out of drive operation and again be returned and pivoted to the driving position.

The servicing cart 2 is further provided with a cleaning head 37 which is only shown schematically in FIG. 2. This cleaning head 37 can be adjusted with an open pivoted opener unit 14 of the friction unit 13 so that it then can carry out a cleaning of the rollers 16 and 16' at this friction unit 13. The cleaning head 37 is provided with a suitable adjusting and control device which in FIG. 2 is illustrated as a hydraulic press (piston cylinder unit) 21.

Figure 4:
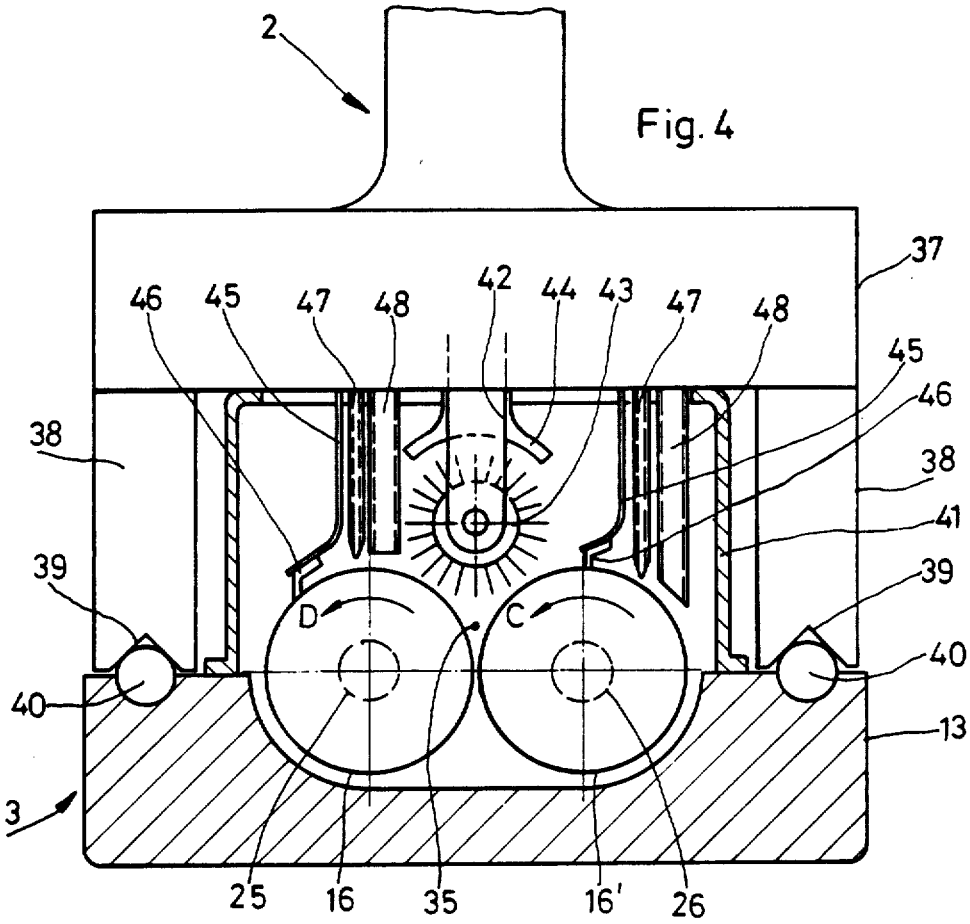
FIG. 4 is a part horizontal sectional view through a spinning unit of an open end friction spinning machine showing the rollers disposed for cleaning by several cleaning elements arranged at a cleaning head, constructed in accordance with an embodiment of the invention.

Each spinning unit 3 is provided with two cylindrical bolt or peg shaped guide elements 40, which are preferably arranged at a housing of the friction unit 13 and at which a counter piece 38 with prismatic shaped receptacles 39 of the servicing head 37 abuts during the adjustment of the cleaning head 37 (FIG. 4) to a cleaning position. The counter piece 38 is in a not further illustrated manner, for example, through a telescopic configuration and an inner spring, so formed that it is elastically biased toward the adjusting direction. With the help of the counter piece 38 and the guide elements 40, the cleaning head 37 is exactly aligned with respect to the rollers 16 and 16'.

The cleaning head 37 posseses a pot shaped cap or hood 41, which abuts at the housing of the friction unit 13 and which thereafter, together with said housing, completely surrounds the rollers 16 and 16'. The individual cleaning elements are arranged inside of the hood 41 so that contaminants loosened by these cleaning elements remain inside of the closed space formed by the hood and roller housing. A lower pressure connection is provided in the floor of the hood 41, through which connection the loosened contaminants are sucked out from the region of this cap 41. The cleaning head 37 includes or carriers a roller shaped brush 43 which is adjustably movable into the region of the wedge slot 35 formed by the two rollers 16 and 16'. This roller shaped brush 43 advantageously possesses an axial length which is somewhat larger than the length of the two rollers 16 and 16'. The roller brush 43 is rotatably driven by means of a toothed belt 42 and a drive mechanism for this belt. It is advantageously provided that the rotational direction of the drive of belt 42 is switchable so that the roller brush 43 can be driven in both rotational directions. At the side of the rollers 16 and 16', the roller brush 43 is surrounded by a suction nozzle 44 which corresponds to the length of the brush 43. The contaminants loosened by the brush 43 and adhered thereto are sucked off through the suction nozzle 44 so that the brush 43 is continuously cleaned. The brush 43 is so adjusted that its brushtips or bristles engage with light pressure at the coating surface of rollers 16 and 16'.

The cleaning head 37 further includes two doctor blades 46 arranged on curved leaf springs 45. The leaf springs and associated doctor blades 46 are respectively adjustably movable with respect to the surfaces of rollers 16 and 16'. The doctor blades 46, which advantageously are manufactured from an abrasion resistant plastic and abut against the roller coating surfaces under a spring tensions have a length corresponding to a surface line of the rollers 16 and 16'. Two blower nozzles 47 are additionally provided at the cleaning head 37, which nozzles 47 are disposed in the cleaning position at a small distance from the respective cover surfaces of the rollers 16 and 16'. These blower nozzles 47 serve to loosen contaminants from positions which cannot be reached with the brush 43 or the doctor blade 46, for example positions inside of the rollers 16 and 16', which rollers 16 and 16' can be provided with suction inserts and/or a profile coating surface. Furthermore, the cleaning head 37 is provided with two suction nozzles 48 which are aligned at the roller cover surfaces and are disposed at a small distance oppositely therefrom. Loosened contaminants can be sucked off from the cover surfaces of the roller 16 and 16' through these suction nozzles 48. The suction nozzles 48 and the blower nozzles 47 have respectively a length which corresponds to the length of a surface line (length of rollers) of the rollers 16 and 16'. However, other embodiments are also contemplated which include a drive mechanism for moving the cleaning elements (doctor blades 46, blow nozzles 47 and suction nozzles 48) in a back and forth movement along the axial direction of rollers 16 and 16'.

During the cleaning process the rollers 16 and 16' are rotated in the same rotational direction (arrows C and D, FIG. 4) so that their entire coating surface is cleaned. In embodiments in which the open end friction spinning machine is configured so that in the servicing position, the operational drive of the rollers 16 and 16' is interrupted, the servicing device of the invention is outfitted with an auxiliary drive by which then the rollers 16 and 16' can be driven during the cleaning process. Underspinning operational conditions the rollers 16 and 16' are driven by means of a tangential belt 27 engaging and running over their shafts 25 and 26. This drive is substituted by means of an auxilixary drive of the servicing cart 2, which (FIG. 3) is formed out of a friction wheel 32 adjustably movable between the two shafts 25 and 26 and which is provided with a toothed wheel 33 over which it is driven by a toothed belt 34. This auxiliary drive can then be adjusted for a suitable rotational speed for the cleaning process. Furthermore, embodiments are contemplated where it is possible to make the driving direction of the auxiliary drive reversible so that the rollers 16 and 16' can be driven opposite their normal rotational direction during the cleaning process.

Figure 3:
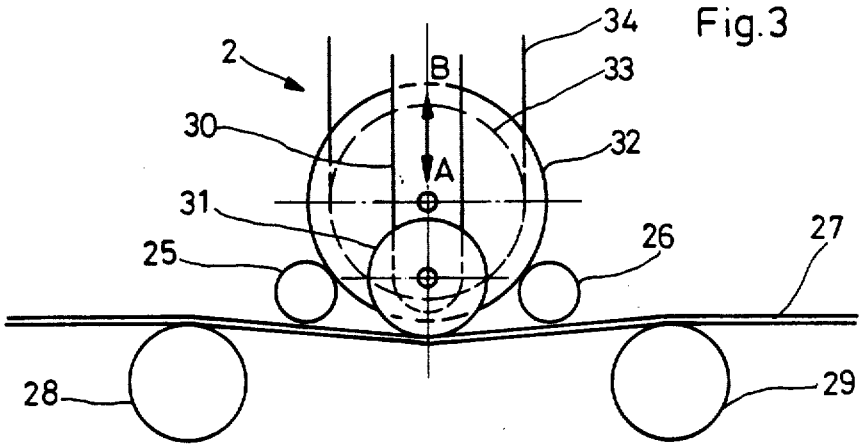
FIG. 3 is an enlarged schematic view of a device of a servicing cart for interrupting the operational drive of the rollers and for driving the rollers from the servicing cart, constructed in accordance with an embodiment of the invention.

For the case that the operational rotational speed of the rollers 16 and 16' is unsuitable for the cleaning procedure and an interruption of the operational drive in the servicing position is not automatic, it is further provided corresponding to FIG. 3 that the servicing cart 2 is outfitted with a device for interrupting the operational drive. The servicing cart (FIG. 3) possesses a lever arm 30 which is adjustable with respect to the spinning unit 3 and which carries a belt left off roller 31, which then can be adjustably moved between the two shafts 25 and 26 and lift off the tangential belt 27 from the shafts 25 and 26. Belt 27 is guided by pressure rollers 28 and 29.

Figure 5:
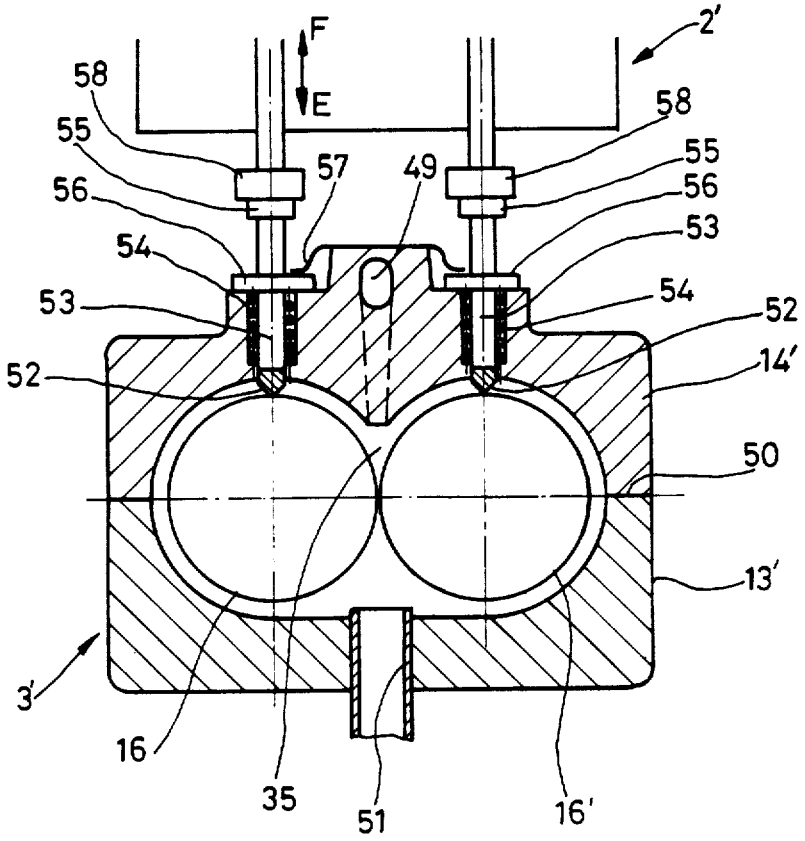
FIG. 5 is a horizontal sectional view through a spinning unit that is provided with cleaning elements which are actuable by a servicing cart constructed in accordance with another embodiment of the invention.

In the embodiment of FIG. 5, the spinning units are respectively provided with their own cleaning elements 52 which are activated through activation elements 58 of the servicing cart 2'. In this case, the opener unit 14' is provided with two cleaning/doctor blades 52 made of plastic, which respectively engage one of the rollers 16 and 16' and which extend along a cover line of these rollers 16 and 16'. The doctor blades 52 are supported on at least two bolts 53 which are guided in guides of the opener unit 14. The bolts 53 are provided with ring collars 56, against which pressure springs 54 are supported which move the bolts 53 with the doctor blades 52 towards the outside out of the opening unit 14 until the ring collar 56 abuts at an abutment 57. In normal operational condition, the doctor blades are lifted off from the rollers 16 and 16' in this manner. The extended parts of the bolts 53 beyond the ring collars 56 are provided with heads 55 by means of which the bolts 53 are so actuated through rams 58 of the servicing cart 2' that the blades 52 can be selectively pressed against the cover surfaces of the rollers 16 and 16'. The activation of the rams 58 of the servicing cart 2' is preferably accomplished with pneumatic or hydraulic or electrical actuators in a not further illustrated manner.

In the embodiment according to FIG. 5, the spinning units 3' need not be opened for the carrying out of a cleaning procedure. The contaminants loosened by the doctor blades 52 are sucked off inside of the spinning aggregates or units 3'. For example, the rollers 16 and 16' can be provided with perforated cover coating surfaces and with suction inserts arranged on the inside which then take over the suction. A suction source in the region of the rollers 16 and 16' is necessary to feed the fibers by means of a fiber feed channel 49 in an air stream to the wedge slot 35 between the two roller 16 and 16'. In order to support this air stream or to create same, a suction nozzle 51 is provided in unit 13' at the side of the wedge slot 35 opposite the fiber feed channel 49. The removal transport of the contaminants can also take place via this suction nozzle 51. In certain preferred embodiments a valve (not illustrated) is provided which is adjustable by means of an actuator provided at the servicing cart 2' to vary and increase the suction effect of the suction nozzle 51 during the cleaning operations.

Because in the embodiment according to FIG. 5, the spinning unit 3 cannot be opened, the normal operational drive of the rollers 16 and 16' is normally not to be interrupted. If the operational rotational speed of the rollers 16 and 16' is however unsuitable for optimum cleaning, a device corresponding to FIG. 3 is provided at the servicing cart 2' by which the operational drive is interrupted and by which the servicing cart 2' then effects the drive of the rollers 16 and 16' by means of a friction wheel 32.

In the embodiment according to FIG. 5, doctor blades made of plastic are arranged at the bolts 53. Embodiments are also contemplated which include other cleaning elements carried by the bolts 53, such as cleat shaped brushes which extend along a coverline of the rollers 16 and 16'.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Apparatus for open end friction spinning comprising:

a plurality of adjacently arranged spinning units exhibiting [respetive] *respective* friction roller pairs defining a yarn forming wedge slot therebetween, fiber supply means for supplying fiber to said wedge slot, and roller driving means for drivingly rotating the rollers in the same rotational direction, mobile servicing unit means including cleaning means for cleaning friction rollers of the spinning units and drive means for selectively moving said mobile servicing unit means to respective servicing positions adjacent spinning units to be cleaned, *and adjustable driving means for driving the rollers of a spinning unit to be cleaned.*

2. Apparatus according to claim 1, wherein at least a plurality of said spinning units each include:

cleaning elements for cleaning the friction rollers of the spinning unit, operating mode holding means for maintaining the cleaning elements out of cleaning engagement with the friction rollers during spinning operation of the spinning unit, and cleaning mode holding means for maintaining the cleaning elements in cleaning engagement with the friction rollers during cleaning operations, wherein said mobile servicing unit means includes means operably engageable with said operating and cleaning mode holding means to selectively move the cleaning elements into cleaning engagement with the friction rollers at the spinning units.

3. Apparatus according to claim 2, wherein said operating mode holding means includes resilient means for biasing the cleaning elements away from cleaning engagement with the friction rollers of the spinning unit, and wherein said mobile servicing unit means includes means operable to move the cleaning elements against the biasing direction of the resilient means.

4. Apparatus according to claim 3, wherein the cleaning elements includes at least one of doctor blades and brushes extending along a surface line of the rollers.

5. Apparatus according to claim 1, wherein the mobile servicing unit means is provided with cleaning elements which are adjustably movable to cleaning positions at the rollers of the respective individual spinning units.

6. Apparatus according to claim 5, wherein one of the rollers and an inlet and opening device of each spinning unit is formed as a relatively movable construction unit which is movable from an operating position to a servicing position to expose the wedge slot, and wherein mobile servicing unit means is outfitted with means engageable with actuating means at the spinning units to selectively move the construction unit to the servicing position and to expose the rollers of the spinning unit.

7. Apparatus according to claim 5, wherein each spinning unit is provided with a movable construction part covering the rollers especially in the region of the wedge slot and said construction part including a portion of a fiber feed channel connecting a fiber inlet and opening device with the rollers, and wherein the mobile servicing unit means is provided with devices for moving this construction part to accomodate cleaning operations.

8. Apparatus according to claim 6, wherein the mobile servicing unit means is provided with cleaning elements, including at least one of doctor blade means, brushing means, and pneumatic cleaning means, which cleaning elements are adjustably movable to the rollers of a spinning unit in the region of the wedge slot formed thereby.

9. Apparatus according to claim 8, wherein the mobile servicing unit means is provided with a roller shaped brush which is adjustably movable to the wedge slot between the two rollers of a spinning unit.

10. Apparatus according to claim 9, wherein the roller shaped brush is rotatably drivingly connected with an adjustable, reversible rotating drive mechanism.

11. Apparatus according to claim 9, wherein the roller shaped brush is aligned with a region at the side of the rollers of the spinning unit to be cleaned where a cleaning nozzle is also arranged.

12. Apparatus according to claim 9, wherein the roller shaped brush is arranged inside of a pot shaped surrounding hood abutting with its rim at one of the surrounding housings for the rollers of the spinning unit being cleaned, when in a cleaning position.

13. Apparatus according to claim 12, wherein the hood is connected at a low pressure source of the mobile servicing unit means.

14. Apparatus according to claim 6, wherein the mobile servicing unit means is provided with at least two suction nozzles which are movably adjustable to positions adjacent the rollers of a spinning unit to be cleaned.

15. Apparatus according to claim 6, wherein the mobile servicing unit means is provided with at least two blowing nozzles which are movably adjustable to positions adjacent the rollers of a spinning unit to be cleaned.

16. Apparatus according to claim 14, wherein the mobile servicing unit means is provided with at least two blowing nozzles which are movably adjustable to positions adjacent the rollers of a spinning unit to be cleaned.

17. Apparatus according to claim 6, wherein the mobile servicing unit means is provided with at least two doctor blades, which doctor blades are adjustably movable to the respective rollers of a spinning unit to be cleaned.

18. Apparatus according to claim 9, wherein said roller shaped brush is disposed inside of a hood carried at the mobile servicing unit means, said hood having rim means engageable with a spinning unit housing part to form a closed space surrounding the friction rollers of a spinning unit when in a cleaning position.

19. Apparatus according to claim 18, wherein additional cleaning elements including at least one of doctor blades, compressed air nozzles, and suction nozzles are arranged inside of and carried with said hood.

20. Apparatus according to claim 19, wherein said additional cleaning elements are drivingly reciprocally movable in the axial direction of the roller of the spinning unit being cleaned.

21. Apparatus according to claim 19, wherein said additional cleaning elements extend at least over the length of the coating line of the rollers of the spinning unit being cleaned.

22. Apparatus according to claim 4, wherein the cleaning elements are arranged on an adjustably movable cleaning head carried by the mobile servicing unit means.

23. Apparatus according to claim 19, wherein the cleaning elements are arranged on an adjustably movable cleaning head carried by the mobile servicing unit means.

24. Apparatus according to claim 22, wherein a plurality of said spinning units are provided with at least one guide element and wherein said cleaning head includes a counter piece which is abuttingly engageable with said at least one guide element to align the cleaning head with respect to a spinning unit being cleaned.

25. Apparatus according to claim 23, wherein a plurality of said spinning units are provided with at least one guide element and wherein said cleaning head includes a counter piece which is abuttingly engageable with said at least one guide element to align the cleaning head with respect to a spinning unit being cleaned.

26. Apparatus according to claim 24, wherein the counter piece is arranged at the cleaning head to be elastically resilient in the adjustment direction.

27. Apparatus according to claim 25, wherein the counter piece is arranged at the cleaning head to be elastically resilient in the adjustment direction.

28. Apparatus according to claim 1, wherein the mobile servicing unit means is provided with [an] *the* adjustable driving apparatus for driving the rollers of a spinning unit to be cleaned.

29. Apparatus according to claim 19, wherein the mobile servicing unit means is provided with [an] *the* adjustable driving apparatus for driving the rollers of a spinning unit to be cleaned.

30. Apparatus according to claim 28, wherein the mobile servicing unit means is provided with a device to interrupt the normal spinning operational drive of the rollers of a spinning unit being cleaned.

*31. An open-end friction spinning apparatus for maintaining friction spinning machines of the type including at least one pair of friction roller surfaces defining a substantially linear yarn formation zone therebetween, comprising:*

*auxiliary driving means for driving the pair of friction roller surfaces during a maintenance operation, said auxiliary driving means including means for driving both friction roller surfaces during the maintenance operation when the auxiliary driving means drives the pair of friction roller surfaces.*

*32. An apparatus according to claim 31, further comprising at least one friction spinning unit having drivable friction surface means comprising at least one cylindrical spinning surface drivable about an axis of rotation, said surface defining a yarn formation zone extending along a line adjacent said surface, said axis of rotation and said line being substantially coplanar.*

*33. An apparatus according to claim 32, wherein said drivable friction surface means comprises a pair of adjacently arranged friction rollers drivable in the same rotational direction and said yarn formation zone comprises a wedge-shaped gap between the friction rollers.*

*34. An apparatus according to claim 32, wherein said auxiliary drive means are carried on movable maintenance unit means.*

*35. An open-end friction spinning apparatus for cleaning friction spinning machines of the type including at least one pair of friction roller surfaces defining a substantially linear yarn formation zone therebetween, comprising:*

*cleaning means for cleaning at least one of the pair of friction roller surfaces, said cleaning means mechanically contacting a substantial portion of the surface of at least one of the pair of friction roller surfaces during a driven rotation of said friction roller surfaces during a cleaning operation.*

*36. An apparatus according to claim 35, further comprising at least one friction spinning unit having drivable friction surface means comprising at least one cylindrical spinning surface drivable about an axis of rotation, said surface defining a yarn formation zone extending along a line adjacent said surface, said axis of rotation and said line being substantially coplanar.*

*37. An apparatus according to claim 36, wherein said drivable friction surface means comprises a pair of adjacently arranged friction rollers drivable in the same rotational direction and said yarn formation zone comprises a wedge-shaped gap between the friction rollers.*

*38. An apparatus according to claim 35, wherein said cleaning means comprises mechanical cleaning means.*

*39. An apparatus according to claim 38, wherein said mechanical cleaning means comprises doctor blade means.*

*40. An apparatus according to claim 38, wherein said mechanical cleaning means comprises brush means.*

*41. An apparatus according to claim 36, wherein said cleaning means comprises mechanical cleaning means.*

*42. An apparatus according to claim 41, wherein said mechanical cleaning means comprises doctor blade means.*

*43. An apparatus according to claim 36, wherein said cleaning means are carried on movable maintenance unit means.*

*44. An apparatus according to claim 43, wherein said cleaning means comprises mechanical cleaning means.*

*45. An apparatus according to claim 44, wherein said mechanical cleaning means comprises doctor blade means.*

*46. An apparatus according to claim 43, wherein said mechanical cleaning means comprises brush means.*

*47. An apparatus according to claim 41, wherein said mechanical cleaning means comprises brush means.*

*48. A method for cleaning open-end friction spinning machines of the type including at least one pair of friction roller surfaces defining a substantially linear yarn formation zone therebetween, said friction roller surfaces each having an axis of rotation, comprising:*

*rotating said friction roller surfaces about said axes of rotation, and*

*applying cleaning means mechanically contacting a substantial portion of the surface of at least one of the pair of friction roller surfaces during the driven rotation of said friction roller surfaces during the cleaning operation for the purpose of removing debris from said surface and insuring consistent spinning surface conditions.*

*49. A method according to claim 48, wherein said drivable friction surface means comprises a pair of adjacently arranged friction rollers drivable in the same rotational direction and said yarn formation zone comprises a wedge-shaped gap between the friction rollers.*

*50. A method according to claim 48, wherein said cleaning means comprises mechanical cleaning means.*

*51. A method according to claim 48, wherein said mechanical cleaning means comprises doctor blade means.*

*52. A method according to claim 48, wherein said mechanical cleaning means comprises brush means.*

*53. A method for maintaining open-end friction spinning machines of the type including at least one pair of friction roller surfaces defining a substantially linear yarn formation zone therebetween, comprising:*

*driving the pair of friction roller surfaces during a maintenance operation using auxiliary driving means which drives both friction roller surface during the maintenance operation when the auxiliary driving means drives the pair of friction roller surfaces; and*

*maintaining the open-end friction spinning machine.*

* * * * *